(12) United States Patent
Gringer et al.

(10) Patent No.: US 7,930,830 B2
(45) Date of Patent: Apr. 26, 2011

(54) SCRAPER WITH SLIDING SAFETY GUARD

(75) Inventors: Donald Gringer, New York, NY (US); Yuan Fang Cheng, Forrest Hills, NY (US)

(73) Assignee: Allway Tools, Inc., Bronx, NY (US)

( * ) Notice: Subject to any disclaimer, the term of this patent is extended or adjusted under 35 U.S.C. 154(b) by 128 days.

(21) Appl. No.: 11/430,356

(22) Filed: May 8, 2006

(65) Prior Publication Data

US 2007/0256306 A1 Nov. 8, 2007

(51) Int. Cl.
 *B26B 5/00* (2006.01)
(52) U.S. Cl. .............. 30/169; 30/294; 30/331; 30/339
(58) Field of Classification Search .............. 30/2, 151, 30/286, 293, 294, 314, 317, 329, 337, 339, 30/331

See application file for complete search history.

(56) References Cited

U.S. PATENT DOCUMENTS

| | | | |
|---|---|---|---|
| 2,119,045 A | 5/1938 | Dietrich | |
| 2,245,096 A | 6/1941 | Penney | |
| 2,286,190 A | 6/1942 | Abrahamsen | |
| 2,321,706 A * | 6/1943 | Salsbury | 30/151 |
| 2,336,284 A | 12/1943 | Nelson | |
| 2,376,887 A | 5/1945 | Walters | |
| 2,644,230 A * | 7/1953 | Anderson | 30/151 |
| 2,862,296 A | 12/1958 | Anderson | |
| 2,948,961 A | 8/1960 | Ortner | |
| 3,107,426 A | 10/1963 | Robinson, Jr. | |
| 3,162,947 A | 12/1964 | Gringer | |
| 3,192,624 A | 7/1965 | Gringer | |
| 3,590,483 A * | 7/1971 | Szczepanski | 30/31 |
| 3,667,122 A | 6/1972 | Black | |
| 3,943,627 A * | 3/1976 | Stanley, Jr. | 30/151 |
| 4,005,525 A | 2/1977 | Gringer | |
| D267,826 S | 2/1983 | Gringer | |
| 0,274,952 A | 7/1984 | Gringer | |
| D274,953 S | 7/1984 | Gringer | |
| 4,558,517 A | 12/1985 | Gringer | |
| D282,881 S | 3/1986 | Gringer | |

(Continued)

FOREIGN PATENT DOCUMENTS

GB 2 085 789 A 5/1982

OTHER PUBLICATIONS

"Soft Grip Tools for Hard Hat Jobs", Allway Tools Inc., 2005.

*Primary Examiner* — Hwei-Siu C Payer
(74) *Attorney, Agent, or Firm* — Gottlieb, Rackman & Reisman, P.C.

(57) ABSTRACT

An improved scraping tool with a retractable safety guard, for removing debris and dirt from glass, tile and the like. The scraping tool comprises a housing formed of two separable housing portions and a guard member, and is adapted to securely retain a single- or double-edged blade between the housing portions. The separable housing portions are removably secured and held in sealed alignment by a plurality of securing elements, including a releasable housing lock mechanism. Within the housing, a scraping blade is held in a rigid, stationary position by a plurality of posts. A guard member, the ends of which form a pair of upper and lower blade shields, is positioned and secured in sliding engagement within the housing.

11 Claims, 7 Drawing Sheets

U.S. PATENT DOCUMENTS

| | | | |
|---|---|---|---|
| 4,805,304 A | 2/1989 | Knoop | |
| 5,022,156 A | 6/1991 | Kallens | |
| 5,025,558 A | 6/1991 | Gilbert | |
| 5,056,226 A | 10/1991 | Gringer | |
| D326,546 S | 5/1992 | Gringer | |
| D327,553 S | 6/1992 | Gringer | |
| 5,121,544 A | 6/1992 | Gilbert | |
| 5,141,517 A | 8/1992 | Shutt | |
| 5,386,632 A | 2/1995 | Schmidt | |
| RE34,979 E | 6/1995 | Gringer | |
| 5,426,855 A | 6/1995 | Keklak | |
| 5,433,004 A | 7/1995 | Thompson | |
| 5,435,064 A | 7/1995 | Brookfield | |
| 5,528,832 A | 6/1996 | Schmidt | |
| 5,545,175 A | 8/1996 | Abidin | |
| 5,581,890 A | 12/1996 | Schmidt | |
| 5,813,121 A | 9/1998 | Gringer | |
| 5,878,501 A * | 3/1999 | Owens et al. | 30/286 |
| D411,429 S | 6/1999 | Gringer | |
| 6,026,575 A | 2/2000 | Wonderley | |
| 6,044,562 A | 4/2000 | Dillenbeck | |
| 6,058,607 A | 5/2000 | Gringer | |
| 6,219,923 B1 | 4/2001 | Sinisi | |
| 6,286,215 B1 | 9/2001 | Panaccione | |
| D453,251 S | 1/2002 | Gringer et al. | |
| 6,349,473 B1 | 2/2002 | Schmidt | |
| 6,415,514 B1 | 7/2002 | Chun | |
| 6,438,849 B1 | 8/2002 | Wonderley | |
| 6,453,559 B1 * | 9/2002 | Marshall et al. | 30/2 |
| 6,487,778 B1 | 12/2002 | Gringer | |
| D468,989 S | 1/2003 | Gringer et al. | |
| 6,530,098 B1 | 3/2003 | Gringer et al. | |
| 6,568,087 B1 | 5/2003 | Gringer | |
| D479,374 S | 9/2003 | Gringer et al. | |
| D479,375 S | 9/2003 | Gringer et al. | |
| 6,732,395 B2 | 5/2004 | Gringer | |
| 6,832,438 B1 | 12/2004 | Gringer | |
| 6,964,100 B1 | 11/2005 | Musland | |
| 7,024,772 B1 * | 4/2006 | Shaver et al. | 30/2 |
| 2002/0124418 A1 * | 9/2002 | Votolato | 30/294 |
| 2003/0110570 A1 | 6/2003 | Gringer | |
| 2003/0110641 A1 | 6/2003 | Gringer | |
| 2004/0045167 A1 | 3/2004 | Gringer | |
| 2005/0081318 A1 | 4/2005 | Boutilier | |
| 2005/0097753 A1 | 5/2005 | Gringer | |
| 2005/0097756 A1 | 5/2005 | Gringer | |
| 2006/0080843 A1 | 4/2006 | Gringer | |

* cited by examiner

SCRAPER WITH SLIDING SAFETY GUARD

FIELD OF INVENTION

This invention relates generally to a device for removing debris and dirt from a surface. More particularly, this invention involves an improved scraper for cleaning tiles, glass and other surfaces. Even more specifically, this invention relates to a handheld single-blade scraper having a sliding safety guard which protects both sides of a leading edge of a blade to protect a user from injury.

BACKGROUND OF THE INVENTION

Generally, when scraping glass, tile or other surfaces to remove stubborn debris and dirt that is layered or otherwise located thereon, professionals and non-professionals alike require a scraping tool which, in addition to various ancillary components, has a sharp blade that is secured to a handle portion. At least one primary concern in connection with scraper tools which incorporate a sharp blade is to provide a tool that is safe both during use and storage of the tool, and which prevents accidental cutting injuries and unintended damage to clothing, surfaces and the like.

In attempts to provide a single solution to the foregoing concerns, a number of scraper tools have been successfully marketed to the public. Many of these products incorporate features that help prevent injuries and unintended damage by either directing users to completely remove the blade from the device or to provide a removable guard cover which sheaths the blade entirely. Despite the advances made in connection with these scraper tools, these products have certain major drawbacks.

For example, the prior art discloses a handheld tool for carrying a scraping/stripping blade. The tool includes a handle, a blade receiver and a blade clamp for pivotally clamping a blade. When the device is in an unlocked position, a blade may quickly be removed, inserted or reversed. When utilizing a conventional double-edged blade, only removing it entirely from the device suffices to completely protect a user from injury, since both sides of the blade are razor sharp. However, even when utilizing a conventional single-edged blade having only one sharp edge, inserting the blade in a position where the sharp edge is concealed while the opposite, relatively dull edge remains exposed, still offers a pointed corner which may undesirably catch and tear a pocket of a user when stored therein.

This product also has other shortcomings. For example, professionals who conduct cleaning, washing and scraping activities on glass (or other surfaces) outdoors while in an elevated position (e.g., on a ladder) typically endure wet conditions generally and/or cold hands at given time. Thus, it is tiresome and difficult for these users to be required to repeatedly unlock the clamp and change the orientation of the blade (i.e., insert, remove and/or reverse). Inevitably, because a user's hands are slippery and cold, the blade often slips out of a user's hand, tears his or her clothing, and/or falls to the ground.

Furthermore, the elongated handle of conventional scraper tools leads to users applying a closed hand grip to the handle when utilizing the scraper tool. In applying a closed grip, the angle at which the blade contacts a surface being acted upon is sometimes too extreme (approaching 80-90 degrees) or otherwise less than optimal, which causes a user's hand and wrist to become easily and more quickly fatigued.

In another prior art scraper marketed under the brand Master Mechanic® of True Value Company, a blade is mounted to a retractable blade carrier that is capable of shifting between an exposed position and a retracted position by virtue of the movement of a thumb-actuated button that is connected to the blade carrier. While this device also offers some advantages in that the scraping blade is easily exposed (for use and for replacement of a blade) and retracted (for storage), the device suffers from at least three major drawbacks. First, since the blade in this device is mounted to a carrier which requires clearance to slide between exposed and retracted positions, it provides a wobbly and loosely secured blade which is undesirable to users who require blade stability, particularly when handling sharp objects. Further, the elongated handle attached to the blade also causes a user's hand and wrist to become more easily fatigued because of the "painting" motion (i.e., straight strokes) that is typically required in employing such a scraping tool to remove dirt or debris. Moreover, when the blade is in a retracted position, the scraper has a plastic protective surface which extends slightly beyond the edge of the blade. The protective surface, which runs adjacent to only the top side of the blade, leaves the underside of the blade unprotected and the sharp blade edge partially exposed. As a result, a user running fingers along the plastic protective surface, believing that he or she was fully protected from injury, may cause a serious wound to be inflicted to the user's hands, particularly when the blade is drawn away from the protective surface.

In other prior art scraping devices where a flexible sliding guard is provided for only one side of the leading edge of a blade, a user may likewise be lured into a false sense of security. When a user pushes his or her fingers against the guard, the guard may flex apart from the blade thereby causing an unexpected severe cut. Accordingly, these forms of scraping tools incorporating only "one-sided" flexible sliding guards have been unsuccessful in preventing all types of injury.

In another prior art scraper which is marketed by Vermop® of Vermop Salmon GmbH, a rigid, stationary blade is mounted within a housing case. Since the scraper incorporates a blade that is removable but non-retractable, a separate detachable cover is provided to conceal the blade when the device is not in use. Although the blade edge is fully protected when the cover is engaged, the cover tends to be easily lost, dropped and is otherwise inconvenient in actual use of the instrument.

SUMMARY OF THE INVENTION

Accordingly, it is an object of the present invention to provide an improved scraping tool with a retractable blade safety guard, for removing debris and dirt from glass, tile and other surfaces.

Another object of the present invention is to provide a scraping tool with a retractable blade safety guard that covers both sides of a leading edge of a sharpened blade and prevents the occurrence of injuries and damage to surfaces and objects caused by a fully or partially exposed blade, or sharp corner thereof, when the device is not in use.

A further object of the present invention is to provide a scraping tool with a retractable blade safety guard that flexes to prevent a blade from undesirably becoming exposed and causing injury to a user.

Another object of the present invention is to provide a scraping tool with a retractable blade safety guard that remains retractably disposed within the housing of the scraping tool when the blade is exposed thereby avoiding the loss of a protective covering.

An additional object of the present invention is to provide a thin scraping tool with a thin retractable safety guard which allows a blade to scrape or otherwise engage glass or any other hard smooth surface at a reduced angle of attack.

Yet another object of the present invention is to provide a scraping tool that has a rigid, stationary blade which allows for stable and secure handling during use.

Still another object of the present invention is to provide a scraping tool that can be utilized in an arcing motion, thereby reducing fatigue in the hands and wrists of a user, thus being more efficient, comfortable and convenient to use.

Additional objectives will be apparent from the description of the invention that follows.

In its broadest aspects, the invention involves an improved scraping tool with a retractable safety guard, for removing debris and dirt from glass, tile and other generally flat surfaces. The scraping tool comprises a housing formed of two separable housing portions, a flexible unshaped guard member and a single- or double-edged blade securely retained between the housing portions.

The separable housing portions are removably secured and held in sealed alignment by a plurality of securing elements, including a releasable housing lock mechanism. The housing lock mechanism comprises a locking arm which extends upwardly from the rear end of the lower housing portion, a finger actuated locking lever extending axially from the arm, and a locking lip opposite the lever that is positioned against a shoulder on the upper housing portion when both housing portions are secured to one another. The locking mechanism works in conjunction with other securing elements which include a plurality of corresponding slots and inserts which facilitate the secured and sealed alignment between the housing portions.

Within the housing, the base of a scraping blade is held in a rigid, stationary position. Preferably, for holding the blade in place, the lower housing portion has two upright posts having a circumference which closely corresponds to two apertures located in the body of the blade, leaving clearance which allows only for removal of the blade.

The guard member, the ends of which form a pair of spaced blade shields, is in sliding connection with the housing. The blade shields are preferably disposed entirely within the housing when the guard member and blade shields are in a retracted position, leaving the sharpened blade edge, which extends outwardly from the housing, in an exposed position. Even in the retracted position, the blade is sandwiched between the folding guard member, which surrounds at least a portion of the blade at all times within the housing. When the blade shields are in an extended position, they sheath both sides of the sharpened blade edge entirely to prevent unintended injury or damage.

In a preferred embodiment, the sliding connection between the guard member and housing is made possible by virtue of apertures in the guard member and correspondingly positioned projections and the like which extend from the separable housing portions. The apertures in the guard member are elongated to permit a sliding or axial motion of the guard member for a predetermined distance limited to the length of the elongated apertures. The distance is sufficient to completely cover both sides of the sharpened edge of the blade that are otherwise exposed when the guard member and blade shields are in a retracted position.

BRIEF DESCRIPTIONS OF THE DRAWINGS

Now referring to the drawings which form a part of the present application,

DETAILED DESCRIPTION OF THE INVENTION

Figure 1:
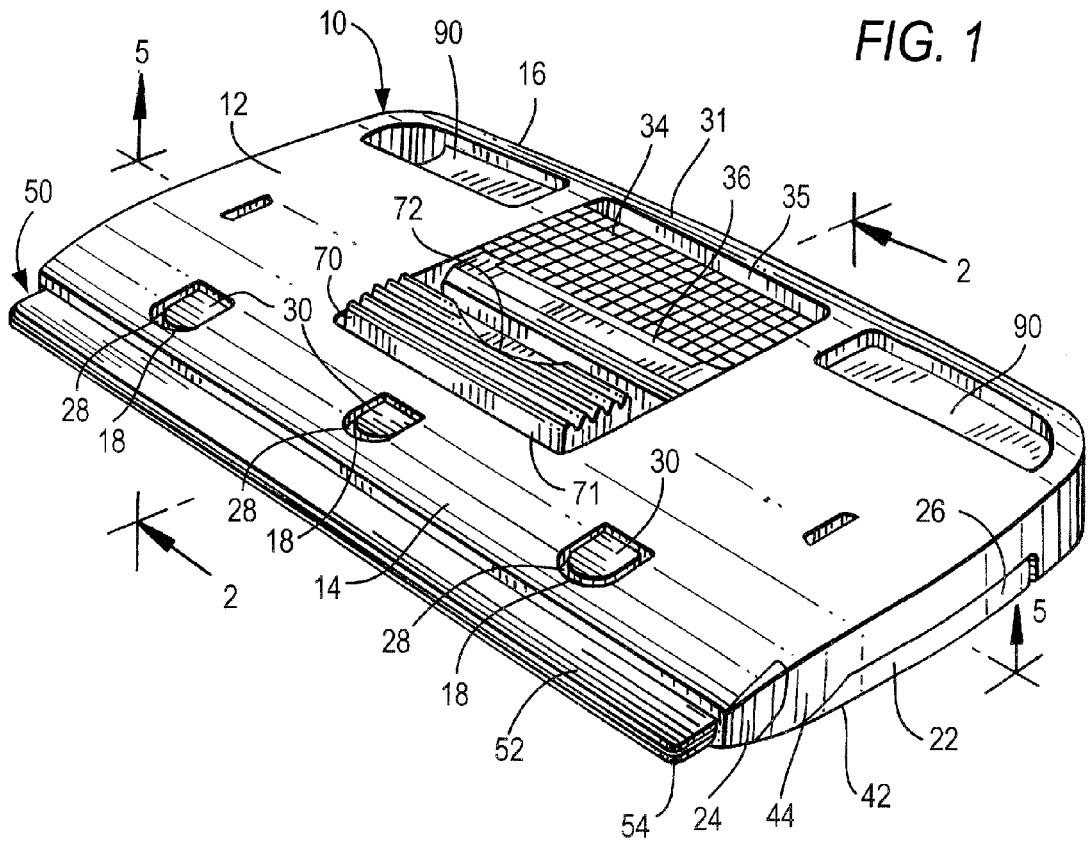
FIG. 1 is a top perspective view of the inventive scraper with sliding safety guard with the blade shields in a forward sheathing position.

Referring to the drawings, FIGS. 1 through 13 depict an embodiment of the inventive scraper with sliding safety guard 10. Generally, the scraper 10 comprises a housing formed of two separable housing portions 12, 22, and a flexible guard member 50. The scraper 10 is adapted to securely retain a double-edged blade 80 between the housing portions 12, 22. The blade 80 is standard, rectangular in form, and has a pair of sharp edges 82, 83 as shown in FIG. 3. Each of these elements is described in greater detail below.

The scraper 10 comprises an upper housing portion 12 and a lower housing portion 22 that are selectively separable from one another, with each of the two housing portions 12, 22 having a front end 14, 24 and rear end 16, 26, respectively. As shown most clearly in FIGS. 1, 2 and 3, the upper housing portion 12 and lower housing portion 22 have securing elements that cooperate to keep the separable housing portions 12, 22 in a securely sealed and aligned position when the scraper 10 is assembled. In the proximity of the front end 14 of the upper housing portion 12 there are three securing slots 18, each of which cooperates with a correspondingly positioned securing insert 28 that is internally located within the lower housing portion 22. As shown in FIG. 2, each securing insert 28 has a securing lip 30 that extends rearwardly and rests against a securing shoulder 20 located within the slot 18 28 in the upper housing portion 12 when the housing portions 12, 22 are secured to one another. Further, the lateral edges of the upper housing portion 12 each has an angled insert 44 that is positioned within a correspondingly angled slot or channel 42 located on the lateral edges of the lower housing portion 22. The angled inserts 44 and slots 42 further facilitate proper securing and alignment of the housing portions 12, 22.

In addition to the foregoing securing elements, the scraper 10 further has a releasable housing lock mechanism 31. In a preferred embodiment, this mechanism comprises a locking arm 32 which extends upwardly from the rear end 26 of the lower housing portion 22. At the top of the arm 32, a finger actuated locking lever 34 extends rearwardly from the arm 32 and is accessible through a locking aperture 35 in the upper housing portion 12. Optionally, the arm 32 has a length that allows the top surface of the locking lever 34 to extend somewhat beyond that of the upper housing portion 12. A locking lip 36 is positioned opposite the locking lever 34 and rests against a locking shoulder 40 when the housing portions 12, 22 are secured to one another. When the housing portions 12, 22 are in the secured or assembled position, downward pressure manually applied to the locking lever 34 forces the locking arm 32 to bend backward and the locking lip 36 32 to slide off from the top surface of the locking shoulder 40. As continued downward pressure on the locking lever 34 is applied after the lip 36 32 is no longer resting on the locking shoulder 40, the rear end 26 of the lower housing portion 22 detaches from the rear end 16 of the upper housing portion 12, while the securing inserts 28 are still positioned in the securing slots 18 and the angled inserts 44 are still positioned in the angled slots 42. Continued separation of the housing portions 12, 22 eventually leads to the securing lips 30 of the securing inserts 28 sliding off the securing shoulder 20 and subsequently exiting the securing slots 18, while the angled inserts 44 exit the angled slots 42.

Conversely, when securing the housing portions 12, 22 to one another, the securing inserts 28 and angled inserts 44 are aligned in a position to enter the securing slots 18 and angled slots 42, respectively. Once the securing inserts 28 and angled inserts 44 are placed into the respective slots 18, 42, the housing portions 12, 22 can be squeezed together with sufficient manual pressure to raise the locking lip 36 over the locking shoulder 40 to secure the housing portions 12, 22 to one another.

Other conventional securing mechanisms may be provided instead of or in addition to each of the foregoing parts which fasten and secure the housing portions. In addition, it should be understood that certain parts of the preferred embodiment for keeping the housing portions 12, 22 secured may be omitted while still allowing the housing portions to be safely fastened to one another. For example, the centrally located insert 28 and slot 18 may be omitted in the formation of the device. Likewise, the configuration of the angled inserts 44 and slots 42 may be altered such that the lateral edges of the housing portions 12, 22 are straight and simply rest adjacent to one another without there being an interlocking connection.

In addition to the securing inserts 28 discussed above, there are a number of additional internal projections within the housing portions 12, 22, some of which serve to maintain a scraping blade 80 in a stationary, rigid position relative to the housing. As shown in FIG. 3, in order to maintain the scraping blade 80 in a stationary position, upright pins or posts 46 are provided on the bottom housing portion 22. Apertures 86 on the blade 80 are correspondingly sized and positioned to receive the posts 46 in the apertures 86. Recesses 48 on the upper housing portion 12 accommodate the posts 46 when the housing portions are closed. The recesses 48 are elongated since the posts 46 shift somewhat as the housing portions 12, 22 are secured to and released from one another as discussed above. Once the blade 80 is mounted on the posts 46 (along with the guard member 50), and the posts 46 are inserted into the recesses 48 when the housing portions 12, 22 are secured to one another, the blade 80 is inhibited from movement relative to the housing.

The blade 80 further conventionally comprises three apertures 88, which are correspondingly positioned in relation to the three securing inserts 28, through which the securing inserts 28 can pass for facilitating the securing of the housing portions 12, 22. In the preferred embodiment, these apertures 88 are not strictly utilized to fully inhibit movement of the blade (although they do contribute thereto) as evidenced by their irregular shapes which do not complement the dimensions of the inserts 28. However, it should be understood that the shape and dimensions of the inserts 28 and/or the apertures 88 on the blade 80 may be altered to correspond to one another so that the inserts 28 retain the blade 80 in a stationary position as do the posts 46. Furthermore, although the scraper of the preferred embodiment comprises a conventional double-edged blade, it should be understood that a single-edged blade may be used as well.

For covering the blade 80 when the scraper 10 is not in use, a double-leaved guard member 50 is provided. In a preferred embodiment, the guard member 50 is formed of a single piece of flexible plastic and is u-shaped. When the guard member 50 is in a folded position, the ends form an upper blade shield 52 and a lower blade shield 54 which provide a cover to protect both sides 85, 87 of the exposed leading edge 82 of the blade 80. As shown in the figures, the entire guard member 50 is in sliding connection with the housing and is retained therein at all times. Whether the blade shields 52, 54 are in the retracted or sheathing position, the blade 80 is at least partially sandwiched within the folded guard member 50 positioned inside the housing. The blade shields 52, 54 are preferably positioned entirely within the housing when they are in a fully retracted position, leaving the sharpened working edge 82 of the blade 80, which partially extends out from the housing, exposed for scraping. When the blade shields 52, 54 are in an extended or sheathing position, they cover both sides 85, 87 of the working edge 82 of the blade 80 in order to prevent unintended injury or damage.

Figure 3:
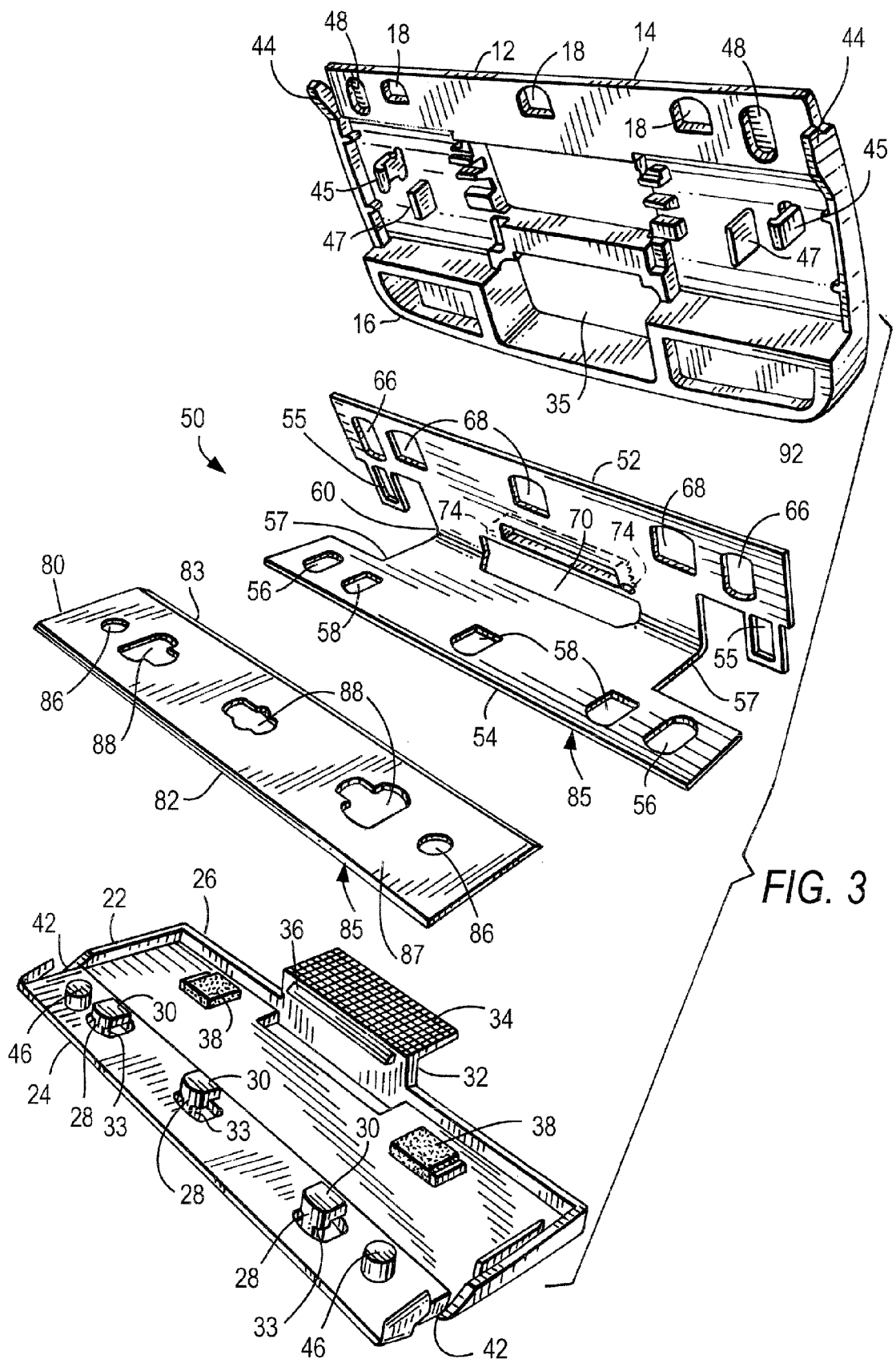
FIG. 3 is an exploded view of the scraper with sliding safety guard, showing the internal sections of the upper and lower separable housing portions, the guard member and a double-edged blade.
Figure 4:
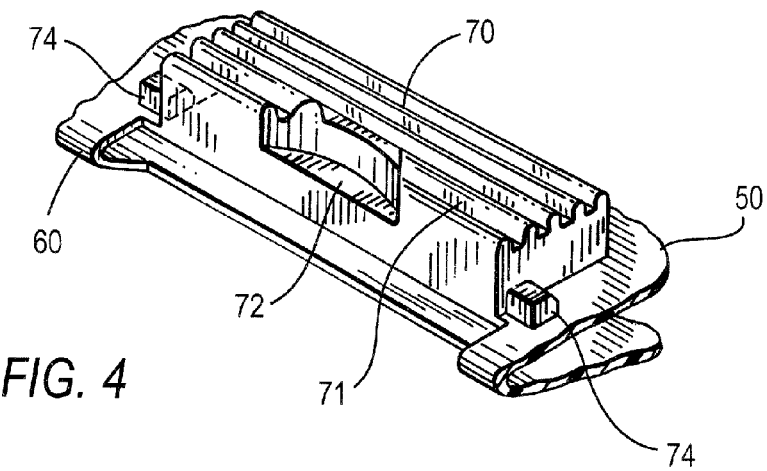
FIG. 4 is a top perspective view of a section of the guard member showing the guard actuator.

As shown in FIGS. 3 and 4, a ridged guard actuator or button 70 is preferably integrally molded to the guard member 50 on the top surface thereof (i.e., opposite the surface which contacts the blade 80). When the guard member 50 is appropriately positioned within the housing, the guard actuator 70 extends through an aperture in the upper housing portion 12 which has dimensions sufficient to allow the actuator 70 move between a fully forward (i.e., sheathing) and rearward (i.e., retracted) position. At the rear end of the actuator 70, a semi-circular cutout 72, is positioned to receive the thumb(s) or other finger(s) of a user to apply pressure to move the guard member 50, particularly in connection with movement of the guard member 50 and blade shields 52, 54 from a retracted position to a sheathing position. Attached at either side of the guard actuator 70 are two pins 74 appropriately sized to be received and rest in a set of notches 76, 78 located on the underside of the upper housing portion 12. Optionally, the guard actuator 70 is of sufficient height to allow the ridged surface 71 to extend somewhat beyond that of the upper housing portion 12.

Figure 2:
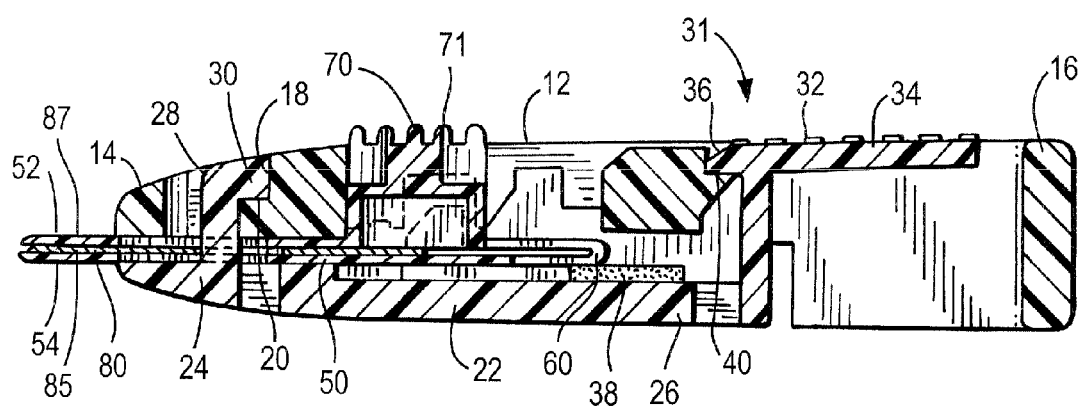
FIG. 2 is a cross sectional view of the scraper with sliding safety guard taken along line 2-2 of FIG. 1.
Figure 5:
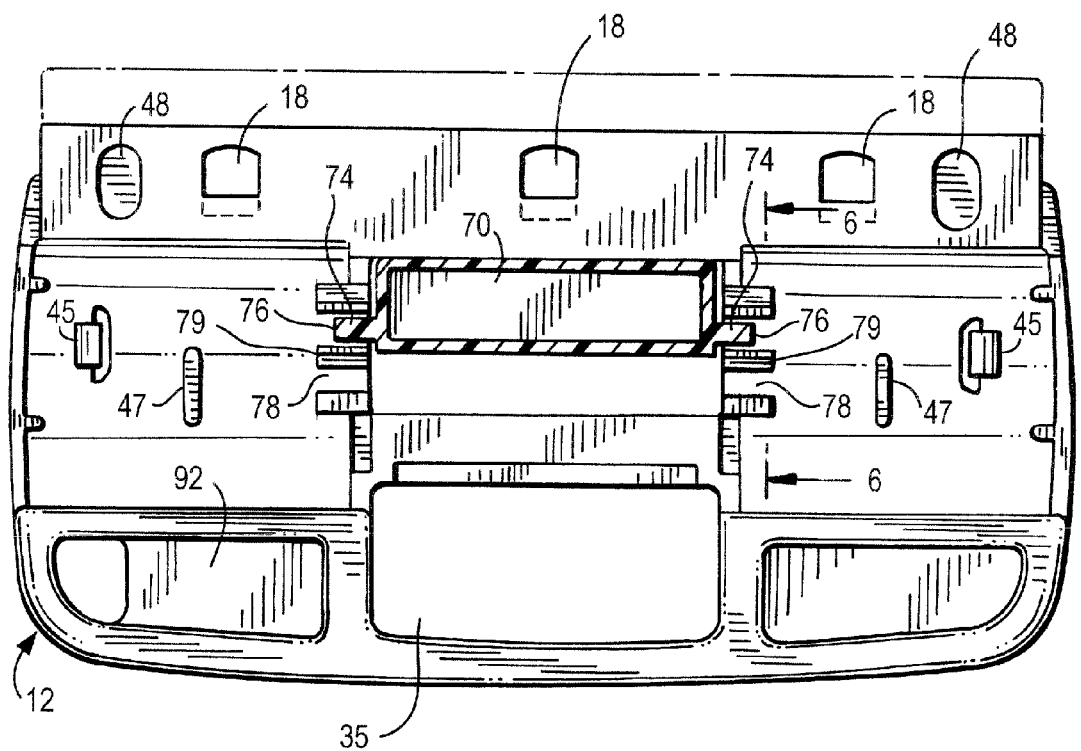
FIG. 5 is an elevational view of the internal section of the upper housing portion showing the guard actuator as a partial cross section of the guard member in the forward sheathing position, with a blade shield in dashed and dotted lines, taken along lines 5-5 of FIG. 1.
Figure 6:
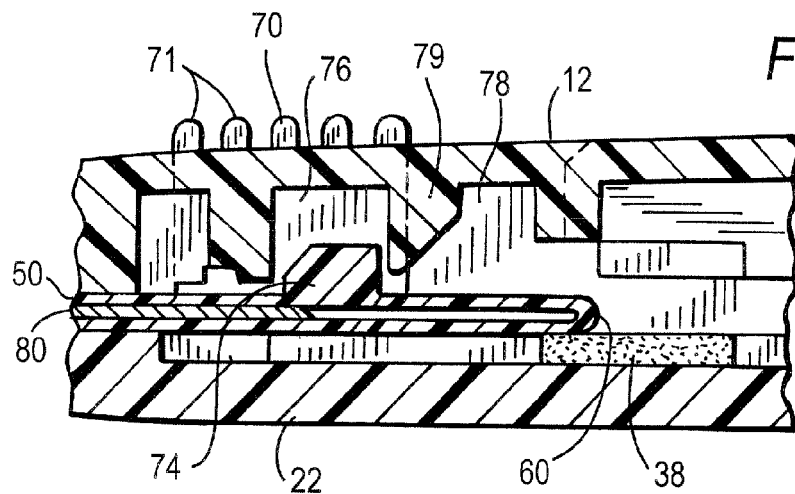
FIG. 6 is a partial cross sectional view of the housing, blade and guard member in the forward sheathing position with the guard actuator securing pin in the forward notch, taken along lines 6-6 of FIG. 5
Figure 7:
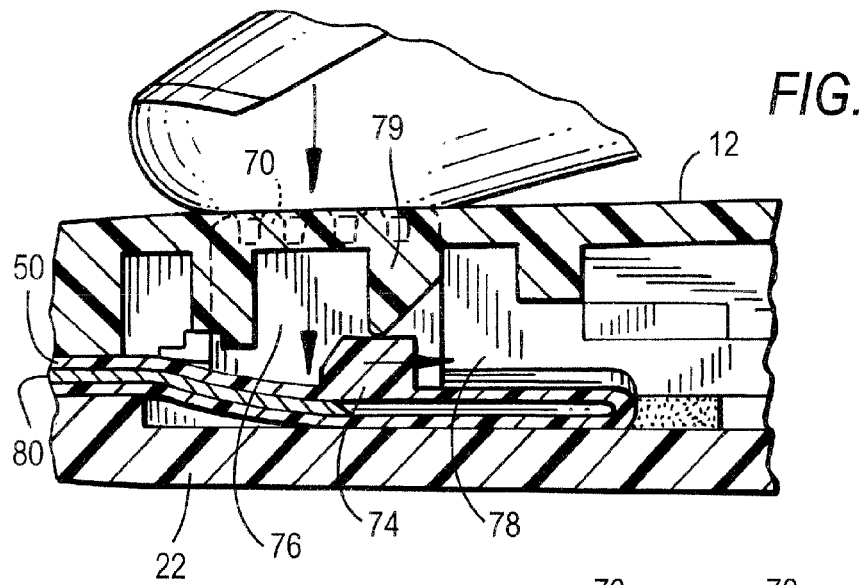
FIG. 7 is a partial cross sectional view of the housing, blade and guard member similar to FIG. 6 but with downward pressure being applied to the guard actuator and the guard member in the process of being retracted.
Figure 8:
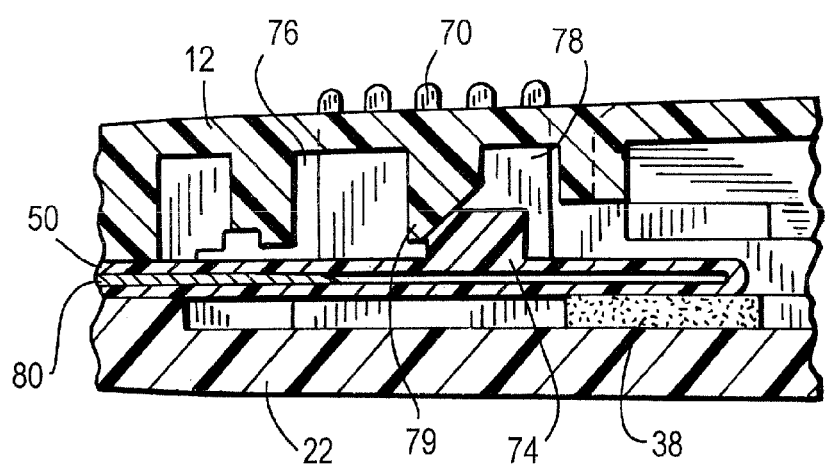
FIG. 8 is a partial cross sectional view of the housing, blade and guard member similar to FIG. 6 but the guard member in the retracted position with the guard actuator securing pin in the rearward notch.
Figure 9:
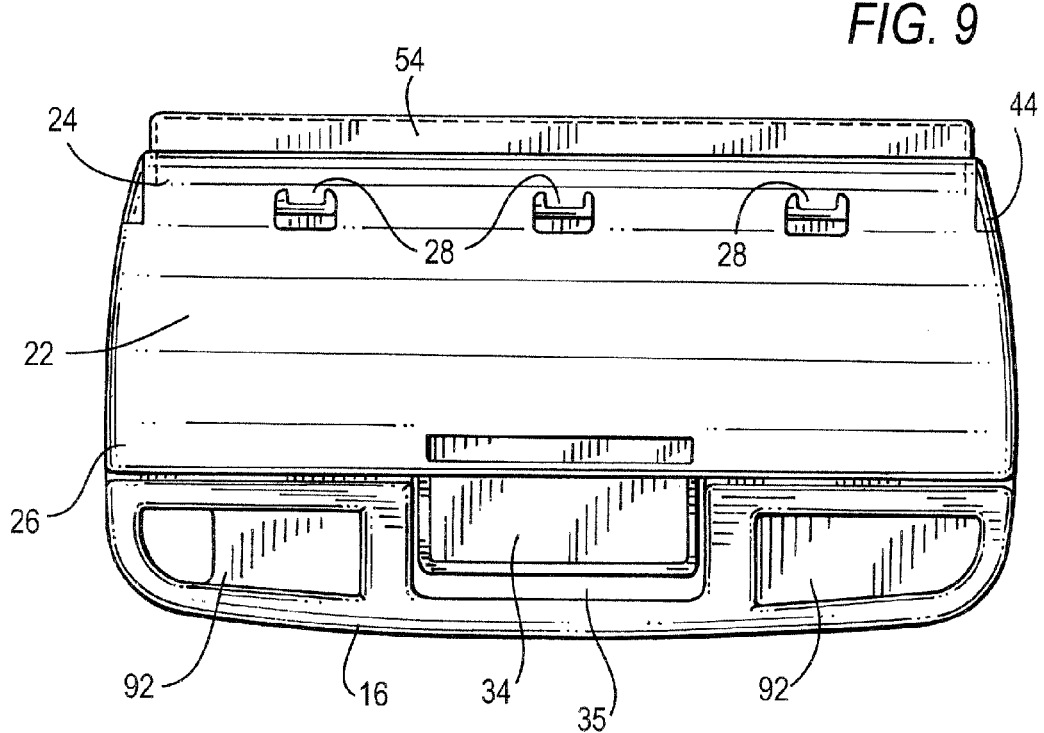
FIG. 9 is an elevational view of the lower housing portion of the inventive scraper with sliding safety guard with the blade shields in a forward sheathing position.
Figure 10:
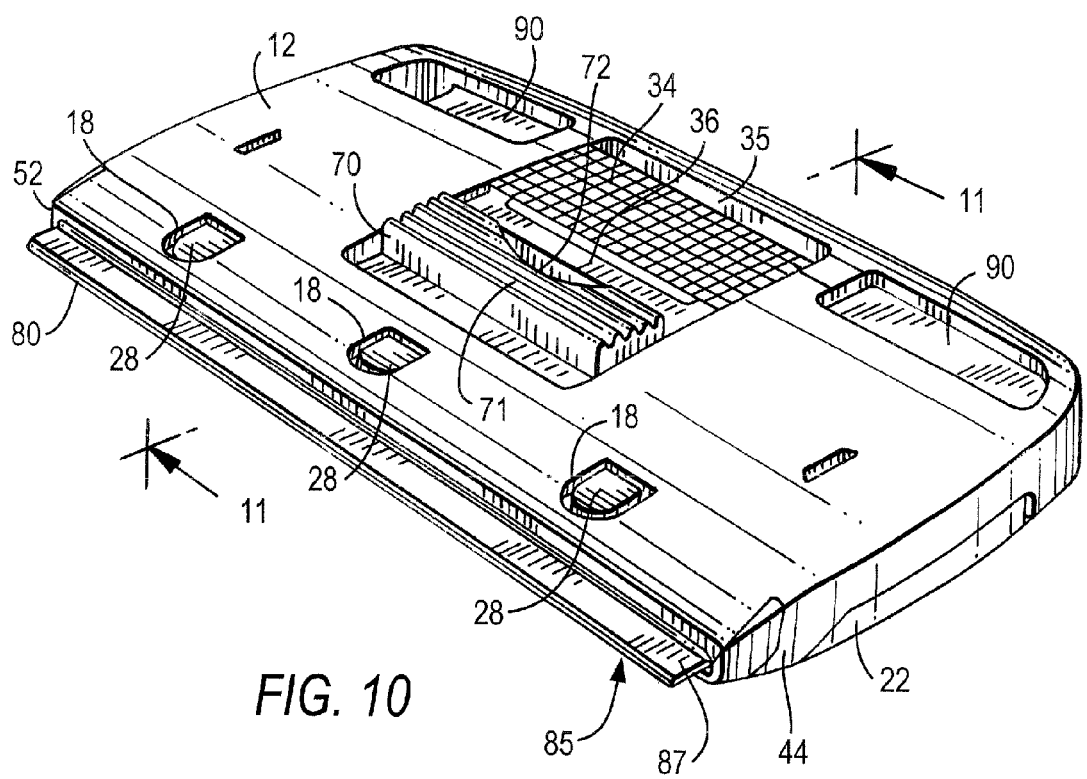
FIG. 10 is a top perspective view of the inventive scraper with sliding safety guard with the blade shields in a retracted position.
Figure 11:
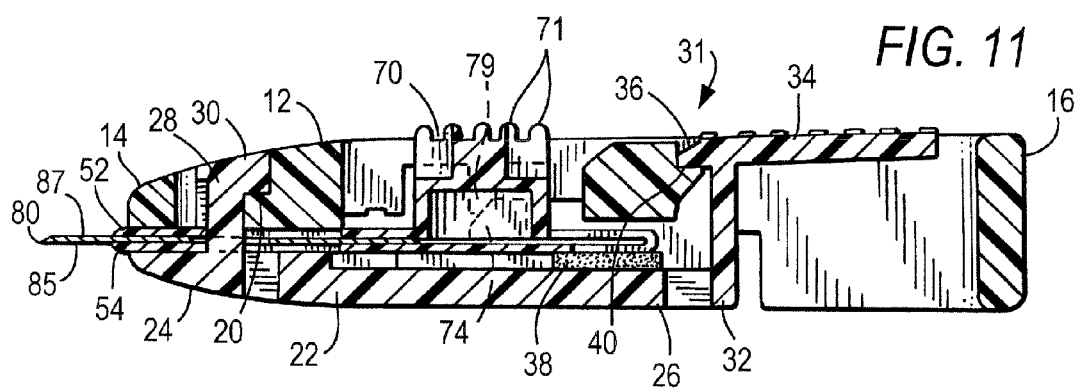
FIG. 11 is a cross sectional view of the scraper with sliding safety guard taken along line 11-11 of FIG. 10, with the guard member and blade shields in a retracted position.

By applying the appropriate magnitude and direction of pressure to the guard actuator 70, a user may shift the entire guard member 50, and hence the blade shields 52, 54, between a sheathing position as shown in FIGS. 1 and 2, and a retracted position as shown in FIGS. 10 and 11. As shown in FIGS. 5 and 6, when the blade shields 52, 54 are extended forward, the securing pins 74 on either side of the actuator 70 rest in the pair of forward notches 76 on the upper housing portion 12. As shown in FIG. 7, in order to move blade shields 52, 54 into a the retracted position, downward pressure is applied to the actuator 70 at the ridged surface 71 causing the guard member 50 to flex and the pins to exit the forward set of notches 76. Absent the application of downward pressure, the guard member 50 is prevented by stops 79 from shifting in a rearward direction. Once the pins 74 exit the notches 76, pressure is applied to shift the guard member 50 in a rearward direction. As shown in FIG. 8, once the stop is cleared, the pressure on the actuator 70 is released allowing the actuator to instantly pop back up and the pins 74 to enter and rest in the rearward notches 78. Significantly, based on the contours of the stops 79 and pins 74, respectively, in order to shift the guard member 50 and blade shields 52, 54 back into the sheathing position, forward pressure is applied, with only little or no downward pressure being required. Once a user has completed scraping a surface, the user slides the guard actuator 70 forward until the pins 74 clicks into place in the forward notches 76.

In connection with the actuator 70 of the present invention, it should be understood that other appropriately shaped indentations may be provided in connection with the actuator 70 instead of the semi-circular cutout 72. Moreover, cutouts may be provided at the front end of the actuator 70 as well as or instead of at the rear end thereof, which may facilitate shifting the guard member into a retracted position. It should also be understood that the securing pins 74 need not be directly connected to the actuator and may be appropriately spaced a relatively short distance away provided that notches are positioned in a corresponding fashion.

In addition to the securing inserts 28 and posts 46, there are additional internal projections extending from the respective housing portions 12, 22, some of which primarily serve to maintain the guard member 50 in sliding connection with the upper and lower housing portions 12, 22, and others which primarily keep the guard member 50 appropriately positioned within the housing. As shown in FIGS. 3 and 5, in order to maintain the guard member 50 in sliding connection with the upper and lower housing portions 12, 22, guard guides 45 having hooked edges are provided. The guard member 50 has correspondingly positioned guard guide slots 55 for receiving the guides 45. The guide slots 55 are elongated to permit longitudinal movement of the guard member 50 relative to the guides 45 and the housing. The slots 55 preferably have a width that is just smaller than that of the hooked ends of the guides 45. Thus, after the guard member 50 is mounted on the guides 45, the hooked ends thereof help keep the guard member 50 from falling off and in proper alignment.

It should further be understood that additional guides may be provided in addition to the two that are present in connection with the preferred embodiment. Likewise, a single master guide and corresponding guide slot may be provided instead. Moreover, it should be understood that the scraper may be constructed with guide slots or recesses positioned within the housing and corresponding guides extending from the guard member.

In addition to the guide slots 55, the guard member 50 has other elongated apertures 58, 68 near the upper and lower blade shields 52, 54, respectively, which are mounted on the securing inserts 28 of the lower housing portion 22. Thus, in the assembly of the scraper 10, the securing inserts 28 first pass through the lower guard member apertures 58, the blade apertures 88 and then the upper guard member apertures 68 before being inserted into the securing slot 18 when the scraper 10 is assembled for use. Likewise, the guard member 50 has elongated post apertures 56, 66 near the upper and lower blade shields 52, 54, respectively, which are mounted on the posts 46 of the lower housing. Thus, in the assembly of the scraper 10, the posts 46 first pass through the lower guard member post apertures 56, the blade apertures 86 and then the upper guard member post apertures 66 before being inserted into the recesses 48 when the scraper 10 is assembled for use. Although the securing inserts 28 and posts 46 serve other functions as detailed above, they also keep the guard member 50 in proper position and alignment at all times.

In a preferred embodiment, indentations 33 located at the base of the securing inserts 28 further assist in keeping the guard member 50 from becoming dislodged. Once the guard member 50 is mounted on the securing inserts 28, the area of the guard member 50 just outside the apertures 58 become removably wedged in the indentations 33 which keeps the guard member 50 from slipping off the insert 28 but which still allows the guard member 50 to be manually removed.

Notably, the longitudinal movement of the guard member 50 is primarily limited by the length of the elongated apertures 55, 56, 58, 66, 68 of the guard member 50, the distance between the pin notches 76, 78, and the size of the aperture on the upper housing 12 that receives the actuator 70. Preferably, each of the foregoing should be sized consistently to permit an equivalent amount of longitudinal movement of the guard member 50 relative to the housing and blade. Of course, whatever the distance the guard member 50 permitted to slide, it should be sufficient to completely cover both sides 85, 87 of the sharpened edge 82 of the blade 80 that is otherwise exposed when the blade shields 52, 54 are in a retracted position.

In the extended or sheathing position, the two blade shields 52, 54 completely cover both sides 85, 87 of the otherwise exposed front edge 82 of the blade 80, and preferably extend slightly beyond the sharpened edge 82, see especially FIG. 2. Since the gap from which the blade shields 52, 54 extend from the front end of the housing are relatively narrow, the blade shields 52, 54 bear against the blade 80, thereby hindering the blade shields 52, 54 from individually flexing outwardly and exposing the blade. The application of outside pressure in the general vicinity of the blade shields 52, 54 compel both blade shields 52, 54 to flex in the same direction preventing exposure of the blade. Thus a user can run a finger over the edge of the scraper 10 with complete security, even if the blade shields 52, 54 flex back and forth.

Figure 12:
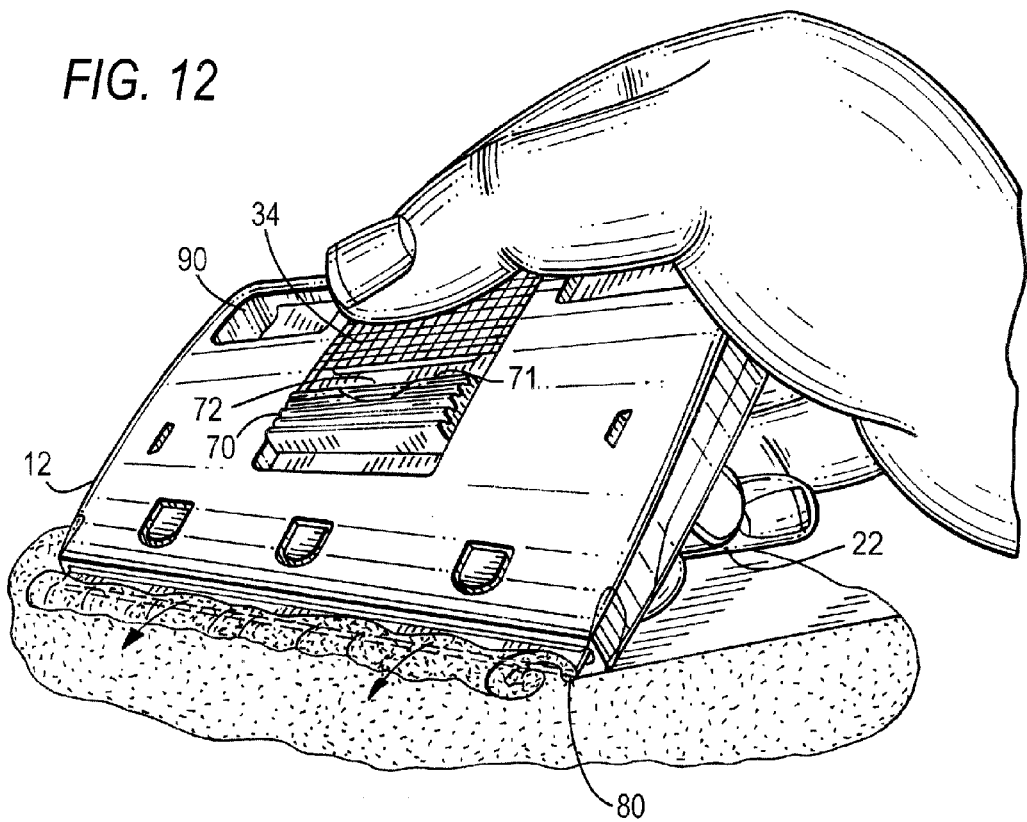
FIG. 12 is a top perspective view showing a user utilizing the scraper with sliding safety guard to remove dirt from a surface.
Figure 13:
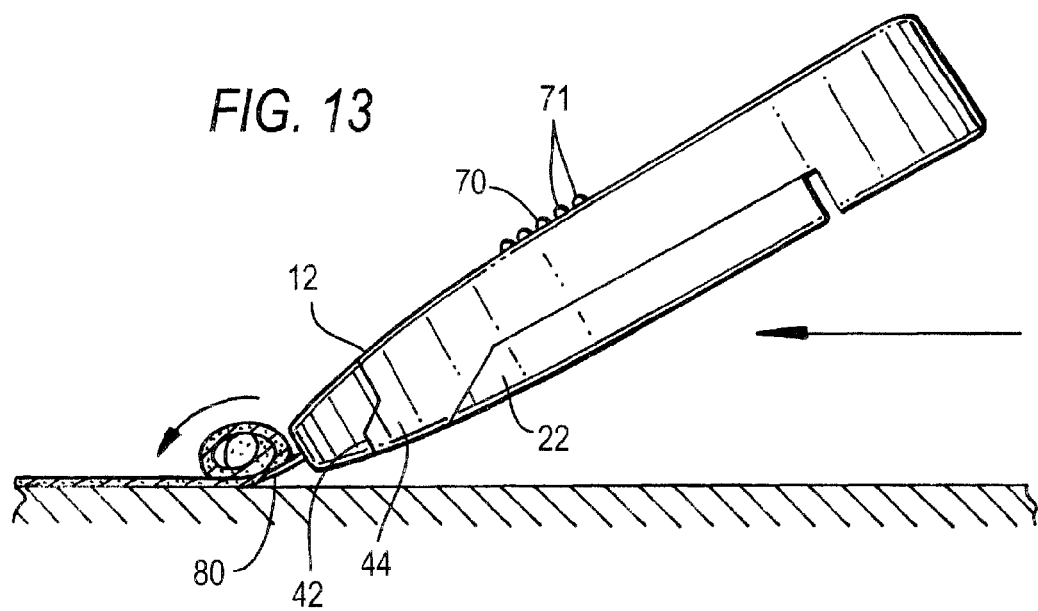
FIG. 13 is a side view of the scraper with sliding safety guard removing dirt from a surface.

In a preferred embodiment, the housing portions 12, 22 and the guard member 50 are formed by injection molding. The housing portions 12, 22 are preferably formed of acetyl resin marketed under the brand Celcon® of the Celanese Corporation, but may also be formed of other conventional rigid plastics, including polyester, ABS and nylon and others. The guard member 50 is also preferably formed of acetyl resin marketed under the brand Celcon®, but may also formed of other varieties of flexible plastics that should also have some spring and/or elasticity. The guard member 50 may be molded flat and subsequently bent to form a u-shape; however it can also be initially molded into a u-shape (or other similar shape) during its formation. Optionally, one or both of the housing portions 12, 22 may include a soft ergonomic grip composed of a thermoplastic elastomer which can be overmolded directly to the housing portions 12, 22 once the housing portions 12, 22 are produced, or separately attached after each is formed. While the housing portions can take on a number of different shapes and sizes, it should be understood that the scraper 10 when fully assembled should be relatively thin, particularly at the front end thereof, so that the scraper blade may contact a surface at an angle of approximately 40-65 degrees as depicted in FIGS. 12 and 13. This permits the scraper 10 to be utilized in an arcing motion without a conventional closed grip and thereby reduces fatigue in the hands and wrists of a user.

When the guard member 50 is appropriately mounted to the housing portions 12, 22, the housing portions 12, 22 may be separated from direct physical contact when the housing lock mechanism 31 and other securing elements are disengaged, but they remain joined to each other by the guard member 50, which is preferably designed to inhibit the complete separation of the housing portions 12, 22. This feature permits a user open the scraper 10 for replacing a blade 80 without having the scraper 10 completely separate into all of its constituent parts (i.e., the housing portions 12, 22 and guard member 50). Thus, when the blade 80 dulls, a simple press of the locking lever 34 permits the scraper 10 to continue to open like a clam shell, exposing the blade 80 for replacing it, yet keeping the housing portions 12, 22 joined to one another by the guard member. Optionally, the lower housing portion 22 includes a deep enough cavity to store one or more spare blades for replacement of a used or dull blade.

While it is preferable to form the guard member as one integral unit, it should be understood that a guard member may be formed of two or more separate parts as well. Such separate parts for forming a guard member may be subsequently joined by conventional means well know in the art, or may function separately yet perform all of the tasks of the guard member of the preferred embodiment of the present invention.

A number of other optional features may be provided in connection with the scraper 10. For example, as shown in FIGS. 3 and 5, border extensions 47 are optionally provided in order to keep the guard member 50 appropriately positioned within the housing and to inhibit lateral movement of the guard member, particularly at or near the center 60 thereof. As shown in FIGS. 2 and 3, another optional feature that may be provided is a rest 38 on the lower housing portion 22 to support the guard member 50 and prevent structural stress thereto. Furthermore, a conventional handle or alternate grip attachment may be provided and adapted attach to the recesses 90, 92 (shown best is FIGS. 1, 5, 9 and 10) at the rear end 16 of the upper housing portions 12. This would provide a user with some flexibility and the ability to reach further to scrape a surface that is otherwise out of reach.

Although the invention is described and depicted in terms of a particular embodiment, it is to be understood that the embodiment shown and described herein is merely illustrative of an application of the principles of the invention. Numerous modifications may be made and other arrangements may be devised without departing from the spirit and scope of the invention.

The invention claimed is:

1. A scraping tool utilizing a blade with a sharpened edge, for removing dirt and debris from a surface comprising:

a housing, said housing having a first housing portion and a second housing portion, the portions being releasably attached to one another and adapted to receive the blade therein;

a guard member positioned within said housing, said guard member being in sliding engagement with said housing and slidable in a direction perpendicular to said sharpened edge of said blade and comprising a pair of flexible blade shields that bear against said blade and adapted to sheath both sides of a leading edge of said blade when said guard member and said blade shields are in a sheathing position such that said blade shields are hindered from individually flexing outwardly, and adapted to expose said sharpened edge of said blade when said guard member and said blade shields are in a retracted position; and a sliding mechanism within said housing comprising a plurality of internally located projections in said housing and correspondingly positioned apertures in said guard member, said projections and said apertures facilitating sliding movement of said guard member relative to said housing, said sliding mechanism enabling movement of said guard member between said sheathing position and said retracted position.

2. The scraping tool of claim 1, said first housing portion having a locking shoulder and said second housing portion having a locking arm, a locking lever attached to said arm and a locking lip opposite said locking lever, said locking lip adapted to releasably engage said shoulder.

3. The scraping tool of claim 1, wherein said plurality of internally located projections are adapted to facilitate the sealed alignment of said housing portions.

4. The scraping tool of claim 1, wherein said plurality of projections are adapted to facilitate sliding movement of said guard member and for retaining said blade in a stationary position.

5. The scraping tool of claim 1, at least one of said housing portions having a plurality of posts for retaining said blade in a stationary position.

6. The scraping tool of claim 1, said guard member having a guard actuator for shifting said blade shields between said sheathing position and said retracted position.

7. The scraping tool of claim 6, said guard member having a pin and said first housing portion having a forward notch and a rearward notch, said pin resting in said forward notch when said blade shields are in said sheathing position and said pin resting in said rearward notch when said blade shields are in said retracted position.

8. The scraping tool of claim 7, said guard actuator formed to require the application of downward and rearward pressure to shift said guard member from said sheathing position to said retracted position.

9. The scraping tool of claim 8, said guard actuator requiring only the application of forward pressure to shift said guard member from said retracted position to said sheathing position.

10. The scraping tool of claim 1, said second housing portion having a cavity adapted to store spare blades.

11. The scraping tool of claim 1, said blade shields being formed of a flexible plastic.

* * * * *